US012780978B2

(12) United States Patent
Choi et al.

(10) Patent No.: US 12,780,978 B2
(45) Date of Patent: Nov. 3, 2026

(54) COMPOSITION FOR FORMING POLYURETHANE FOAM, FOAM FOR VEHICLE SEAT MANUFACTURED FROM COMPOSITION FOR FORMING POLYURETHANE FOAM, METHOD OF MANUFACTURING THE SAME, AND VEHICLE SEAT INCLUDING FOAM FOR VEHICLE SEAT

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Kwon Yong Choi, Seoul (KR); Jong Hwan Suhr, Seoul (KR); Jin Woo Lee, Suwon-si (KR); Bo Gyeong Jin, Suwon-si (KR); Kyeong Hoon Kang, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 594 days.

(21) Appl. No.: 18/231,374

(22) Filed: Aug. 8, 2023

(65) Prior Publication Data

US 2024/0301120 A1 Sep. 12, 2024

(30) Foreign Application Priority Data

Mar. 7, 2023 (KR) ........................ 10-2023-0029580

(51) Int. Cl.

| | |
|---|---|
| ***C08G 18/34*** | (2006.01) |
| ***C08G 18/08*** | (2006.01) |
| ***C08G 18/18*** | (2006.01) |
| ***C08G 18/32*** | (2006.01) |
| ***C08J 9/04*** | (2006.01) |
| *C08G 101/00* | (2006.01) |

(52) U.S. Cl.

CPC ......... *C08G 18/34* (2013.01); *C08G 18/0847* (2013.01); *C08G 18/18* (2013.01); *C08G 18/3206* (2013.01); *C08G 2101/00* (2013.01)

(58) Field of Classification Search

CPC .... C08G 18/34; C08G 18/0847; C08G 18/18; C08G 18/3206; C08G 2101/00; C08G 18/1833; C08G 18/2063; C08G 2110/0083; C08G 18/4018; C08G 18/4277; C08G 18/4854; C08G 18/6644; C08G 18/6677; C08G 18/7671; C08G 18/6611; C08G 2350/00; C08G 18/40; C08G 18/14; C08J 2375/04; C08J 9/0023; C08J 9/365; B60N 2/00; C08L 75/04; C08L 75/06; C08L 75/08; C09D 7/61; C08K 3/041

See application file for complete search history.

(56) References Cited

U.S. PATENT DOCUMENTS

| | | | | |
|---|---|---|---|---|
| 9,022,464 B2 | 5/2015 | Feng et al. | | |
| 10,289,254 B2 | 5/2019 | Fan et al. | | |
| 2006/0134398 A1* | 6/2006 | Nakamura | ......... | C08G 18/7664 264/51 |
| 2017/0174818 A1 | 6/2017 | Vonorcik, Jr. et al. | | |
| 2018/0057630 A1* | 3/2018 | Lim | ................... | C08G 18/7671 |
| 2020/0231740 A1 | 7/2020 | Zhang et al. | | |

FOREIGN PATENT DOCUMENTS

| | | | | |
|---|---|---|---|---|
| KR | 20120045775 A | * | 5/2012 | ........... A61L 31/122 |
| KR | 10-1271535 B1 | | 6/2013 | |
| KR | 20150029309 A | * | 3/2015 | ........... B29C 51/421 |
| KR | 10-1511562 B1 | | 4/2015 | |
| KR | 20150039418 A | * | 4/2015 | ............. C08K 3/013 |
| KR | 10-1538056 B1 | | 7/2015 | |
| KR | 20160108747 A | * | 9/2016 | .............. C08J 9/143 |
| KR | 10-1874882 B1 | | 7/2018 | |
| KR | 10-2136253 B1 | | 7/2020 | |

* cited by examiner

*Primary Examiner* — K. Boyle
(74) *Attorney, Agent, or Firm* — Morgan, Lewis & Bockius LLP

(57) ABSTRACT

A composition for forming polyurethane foam including a polyol mixture containing two or more polyols having different melting points, an isocyanate compound, and a blowing agent, wherein the two or more polyols are respectively included in the same weight ratio. A foam for a vehicle seat including a polyurethane foam manufactured from the composition for forming polyurethane foam described above. A method of manufacturing a foam for a vehicle seat including manufacturing a polyurethane foam from the composition for forming polyurethane foam described above, and coating a coating layer composition containing 1 to 5 wt % of carbon nanotubes on at least one surface of the polyurethane foam. A vehicle seat including the foam for a vehicle seat described above.

12 Claims, 3 Drawing Sheets

COMPOSITION FOR FORMING POLYURETHANE FOAM, FOAM FOR VEHICLE SEAT MANUFACTURED FROM COMPOSITION FOR FORMING POLYURETHANE FOAM, METHOD OF MANUFACTURING THE SAME, AND VEHICLE SEAT INCLUDING FOAM FOR VEHICLE SEAT

CROSS-REFERENCE TO RELATED APPLICATION(S)

This application claims benefit of priority to Korean Patent Application No. 10-2023-0029580 filed on Mar. 7, 2023 in the Korean Intellectual Property Office, the disclosure of which is incorporated herein by reference in its entirety.

BACKGROUND

1. Technical Field

The present disclosure relates to a composition for forming polyurethane foam, a foam for a vehicle seat manufactured from the composition for forming polyurethane foam, a method of manufacturing the same, and a vehicle seat including the foam for a vehicle seat.

2. Description of Related Art

As the technology development of the vehicle industry leads to the development of vehicle seat technology, vehicle seats, which have been formed of springs, cloth, latex foam, or the like in the related art, are currently being manufactured by being replaced with polyurethane foam having excellent productivity and capable of maintaining elasticity and support for a long period of time.

A foam for a vehicle seat including such polyurethane foam is a part that is in close contact with a user for a long time, and recently, there has been increasing demand for improved performance such as seating comfort and the like.

Accordingly, Korean Patent Registration No. 10-1511562 B1 discloses a technology capable of providing cushions optimized for different body types and preventing a decrease in seating comfort due to aging of polyurethane foam by inserting an air cushion inside of the foam for a vehicle seat containing polyurethane foam, such that the cushion shape may be easily changed to suit the user's weight and body shape to increase seating comfort.

However, since the related art technologies only provide a customized shape of foam for a vehicle seat according to the user's weight and body shape, there is a problem in that it is impossible to change the mechanical properties according to the hardness of the vehicle seat preferred by each user. Accordingly, a technique for controlling the mechanical properties of the foam for a vehicle seat itself is required in order to provide a user-customized and excellent seating experience.

SUMMARY

An aspect of the present disclosure is to provide a composition for forming polyurethane foam, including two or more types of polyols having different melting points, a foam for a vehicle seat prepared from the composition for forming polyurethane foam and having a hardness of at least three levels, a method of manufacturing the same, and a vehicle seat including the foam for a vehicle seat.

According to an aspect of the present disclosure, a composition for forming polyurethane foam includes a polyol mixture containing two or more polyols having different melting points, an isocyanate compound, and a blowing agent. The two or more polyols are respectively included in the same weight ratio.

According to an aspect of the present disclosure, a foam for a vehicle seat includes a polyurethane foam manufactured from the composition for forming polyurethane foam described above.

According to an aspect of the present disclosure, a method of manufacturing a foam for a vehicle seat includes manufacturing a polyurethane foam from the composition for forming polyurethane foam described above, and coating a coating layer composition containing 1 to 5 wt % of carbon nanotubes on at least one surface of the polyurethane foam.

According to an aspect of the present disclosure, a vehicle seat includes the foam for a vehicle seat described above.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
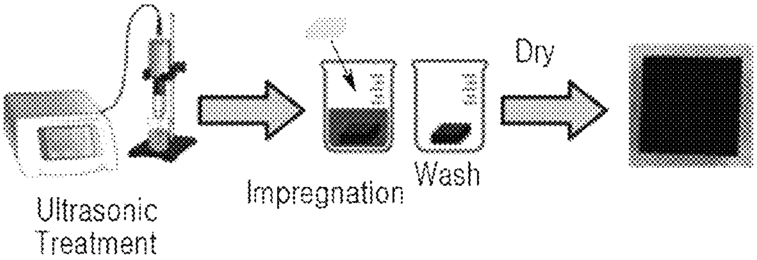
FIG. 1 is a diagram schematically illustrating a manufacturing method of a foam for a vehicle seat according to example embodiments.

Hereinafter, various embodiments according to the present disclosure will be described, but the embodiments may be modified in many different forms, and the scope is not limited to the embodiments described below.

Composition for Forming Polyurethane Foam

The composition for forming polyurethane foam according to the present disclosure may include a polyol mixture, an isocyanate compound, and a foaming agent. In addition, the composition for forming polyurethane foam may further include a crosslinking agent, a cell opener, a surfactant, and a catalyst.

Polyol Mixture

The polyol mixture may include two or more polyols. In an embodiment, the polyol mixture may include two types of polyols.

In example embodiments, the polyol mixture may include two or more selected from the group consisting of, for example, polytetramethylene glycol (PTMG), polycaprolactone (PCL), polyethylene glycol (PEG) and polytrimethylene ether glycol (PO3G).

The polyols may have different melting points.

In an embodiment, the melting point of each of the polyols may be about 10 to about 65° C. If the melting point of each of the polyols is less than about 10° C., the viscosity of the polyol decreases and the foaming amount of the polyurethane foam prepared from the composition for forming the polyurethane foam decreases, and accordingly, the change in hardness of the polyurethane foam may be small. If the melting point of each of the polyols is greater than about 65° C., the manufacturing temperature of the polyurethane foam increases, and thus the polyurethane foam may shrink without curing. The polyurethane foam and the change in hardness of the polyurethane will be described later in detail.

In an embodiment, the two or more polyols in the polyol mixture may have a melting point difference of about 10 to about 50° C. from each other. If the two or more polyols in the polyol mixture have a melting point difference of less than about 10° C. from each other, the temperature difference between the glass transition temperatures of the polyurethane foam is small, controlling the hardness of the polyurethane foam may not be facilitated. When the two or more polyols in the polyol mixture have a melting point difference of more than about 50° C. from each other, the polyurethane foam has a high glass transition temperature and may be thermally decomposed before hardness change. The glass transition temperature of the polyurethane foam will be described in detail later.

The two or more polyols may be included in the polyol mixture in the same weight ratio. For example, when two types of polyols are included, their weight ratio may be 1:1, and when three types of polyols are included, their weight ratio may be 1:1:1.

In an embodiment, each of the polyols may be included in the composition for forming polyurethane foam in an amount of about 30 to about 40 wt % based on the total weight of the composition for forming polyurethane foam. If each of the polyols is included in the polyurethane foam-forming composition in an amount less than about 30 wt % based on the total weight of the polyurethane foam-forming composition, the content of each of the polyols included in the polyurethane foam-forming composition is small, the change in hardness of the polyurethane foam may be small. If each of the polyols is included in the polyurethane foam-forming composition in an amount greater than about 40 wt % based on the total weight of the polyurethane foam-forming composition, the content of each of the polyols included in the polyurethane foam-forming composition is large. As a result, the hardness of the polyurethane foam decreases, and thus a foam for a vehicle seat to be described later including the polyurethane foam may not provide a degree of seating comfort desired by a user. The foam for a vehicle seat will be described later in detail.

In example embodiments, the polyol may have a weight average molecular weight (Mw) of about 1,000 to about 14,000 g/mol. If the polyol has a weight average molecular weight (Mw) of less than about 1,000 g/mol, the hydroxyl value (OH value) of the polyol increases and the content of the isocyanate compound to be described later included in the composition for forming polyurethane foam is increased. Accordingly, the hardness of the polyurethane foam may increase. For this reason, the foam for a vehicle seat may not provide a degree of seating comfort desired by the user. If the polyol has a weight average molecular weight (Mw) of greater than about 14,000 g/mol, the hardness of the polyurethane foam decreases, and thus the foam for a vehicle seat may not provide a degree of seating comfort desired by the user. The isocyanate compound will be described in detail later.

Isocyanate Compound

The polyurethane foam may be prepared by forming a resin premix by stirring and mixing the polyols, the crosslinking agent, the blowing agent, the cell opener, the surfactant, and the catalyst, and then adding an isocyanate compound to the resin premix and stirring the mixture. By adding the isocyanate compound to the resin premix, the reaction is started, and the polyurethane foam may be prepared.

In example embodiments, the isocyanate compound may include one or more selected from the group consisting of, for example, toluene diisocyanate (TDI), naphthalene-1,5-diisocyanate, p-phenylene diisocyanate, tolidine diisocyanate diisocyanate, 4,4'-diphenyl methane diisocyanate, hexamethylene diisocyanate (HDI), dicyclohexylmethane diisocyanate, methylene diphenyl di Isocyanate (MDI), 1-isocyanato-4-((4-isocyanatohexyl)methyl]cyclohexane, and isoporone diisocyanate.

In an embodiment, the isocyanate compound may be included in the composition for forming polyurethane foam in an amount of about 15 to about 30 wt % based on the total weight of the composition for forming polyurethane foam. If the isocyanate compound is included in the composition for forming polyurethane foam in an amount of less than about 15 wt % based on the total weight of the composition for forming polyurethane foam, since the hardness of the polyurethane foam is reduced, a foam for a vehicle seat to be described later including the polyurethane foam may not provide a degree of seating comfort desired by a user. If the isocyanate compound is included in the polyurethane foam-forming composition in an amount greater than about 30 wt % based on the total weight of the polyurethane foam-forming composition, the content of each of the polyols included in the polyurethane foam-forming composition may be small, and the change in hardness of the polyurethane foam may be small.

Blowing Agent

As used herein, the term "blowing agent" may be used interchangeably with the term "foaming agent." The foaming agent performs the function of foaming the polyurethane formed by crosslinking the respective polyols and the isocyanate compound into polyurethane foam, and any agent commonly used to perform this function may be used without limitation.

In example embodiments, the foaming agent may be at least one selected from the group consisting of a solid foaming agent and an inert gas. Specifically, the foaming agent may include at least one selected from the group consisting of, for example, water, hydrofluorocarbon (HFC), methylene chloride, n-butane, isobutane, n-pentane isopentane, dimethyl ether, acetone, carbon dioxide, and the like.

In an embodiment, the foaming agent may be included in the composition for forming polyurethane foam in an amount of about 1 to about 1.5 wt % based on the total weight of the composition for forming polyurethane foam. If the foaming agent is included in the polyurethane foam-forming composition in an amount of less than about 1 wt % based on the total weight of the polyurethane foam-forming composition, the polyurethane may not be sufficiently foamed. If the foaming agent is included in the polyurethane foam-forming composition in an amount greater than about 1.5 wt % based on the total weight of the polyurethane foam-forming composition, the polyurethane foam may be excessively foamed and the polyurethane foam may be formed by shrinking.

Cross-Linking Agent

The crosslinking agent may be used without limitation as long as it is commonly used to form the polyurethane by crosslinking the respective polyols and the isocyanate compound.

In example embodiments, the crosslinking agent may include, for example, at least one selected from the group consisting of glycerin, 1,4-butanediol (BDO) and diethanolamine (DEOA).

In an embodiment, the crosslinking agent may be included in the composition for forming polyurethane foam in an amount of about 0.1 to about 0.5 wt % based on the total weight of the composition for forming polyurethane foam. If the crosslinking agent is included in the composition for forming polyurethane foam in an amount of less than about 0.1 wt % based on the total weight of the composition for forming polyurethane foam, the polyurethane foam may be formed by contraction due to a decrease in bonding strength between each of the polyols and the isocyanate compound. If the crosslinking agent is included in the composition for forming polyurethane foam in an amount greater than about 0.5 wt % based on the total weight of the composition for forming polyurethane foam, the bonding strength between each of the polyols and the isocyanate compound increases, so that the polyurethane is not sufficiently foamed into polyurethane foam, and the hardness of the polyurethane foam may increase.

Cell Opener

The cell opener performs a function of forming a pore cell inside the polyurethane when forming polyurethane foam, and any one commonly used to perform this function may be used without limitation.

In example embodiments, the cell opener may include at least one selected from the group consisting of, for example, ethylene oxide, a polymer synthesized from a propylene oxide monomer, polyoxyethylene, and polyoxyalkylene.

In an embodiment, the cell opener may be included in the composition for forming polyurethane foam in an amount of about 1 to about 2 wt % based on the total weight of the composition for forming polyurethane foam. If the cell opener is included in the polyurethane foam-forming composition in an amount less than about 1 wt % based on the total weight of the polyurethane foam-forming composition, the polyurethane is not sufficiently foamed into polyurethane foam, and the polyurethane foam is not sufficiently expanded. The cell size of the polyurethane foam is reduced, and fewer cells are formed in the polyurethane foam, so that the carbon nanotubes included in the coating layer composition to be described later may not be sufficiently coated to the polyurethane foam. If the cell opener is included in the composition for forming polyurethane foam in an amount greater than about 2 wt % based on the total weight of the composition for forming polyurethane foam, the cell is excessively formed in the process of foaming the polyurethane into the polyurethane foam. Many cells may be formed, and the polyurethane foam may be formed by contraction. The coating composition and the process of coating carbon nanotubes to the polyurethane foam will be described later in detail.

Surfactants

The surfactant performs a function of preventing overlapping and coalescence of the pore cells, and any surfactant commonly used to perform this function may be used without limitation.

In example embodiments, the surfactant may include, for example, a group consisting of silicon.

In an embodiment, the surfactant may be included in the composition for forming polyurethane foam in an amount of about 0.5 to about 1 wt % based on the total weight of the composition for forming polyurethane foam. If the surfactant is included in the polyurethane foam-forming composition in an amount of less than about 0.5 wt % based on the total weight of the polyurethane foam-forming composition, in the process of foaming the polyurethane into the polyurethane foam, the surface tension increases and the cell size decreases, and as a result, the polyurethane may not be sufficiently foamed into polyurethane foam. If the surfactant is included in the composition for forming polyurethane foam in an amount greater than about 1 wt % based on the total weight of the composition for forming polyurethane foam, the surface tension is reduced as compared to the force required to maintain the foam such that the polyurethane foam may be formed by contraction, in the process of foaming the polyurethane into the polyurethane foam.

Catalyst

The catalyst performs a function of accelerating the crosslinking reaction of each of the polyols and the isocyanate compound, and any catalyst commonly used to perform this function may be used without limitation.

In example embodiments, the catalyst may include, for example, at least one selected from the group consisting of triethylene diamine and dimethylaminoethyl.

In an embodiment, the catalyst may be included in the composition for forming polyurethane foam in an amount of about 0.1 to about 0.5 wt % based on the total weight of the composition for forming polyurethane foam. If the catalyst is included in the composition for forming polyurethane foam in an amount of less than about 0.1 wt % based on the total weight of the composition for forming polyurethane foam, the crosslinking reaction between the polyols and the isocyanate compound does not sufficiently occur. Polyurethane may not foam sufficiently into polyurethane foam. If the catalyst is included in the polyurethane foam-forming composition in an amount greater than about 0.5 wt % based on the total weight of the polyurethane foam-forming composition, the foaming amount of the polyurethane increases, but the curing required to maintain the foam is not sufficient, so that the polyurethane foam may be formed by contraction.

As described above, the polyurethane foam-forming composition may include the two or more polyols having different melting points, and the two or more polyols may be included in the polyurethane foam-forming composition at the same weight ratio. Accordingly, the polyurethane foam prepared from the polyurethane foam-forming composition may have two or more glass transition temperatures (Tg).

Due to this, the foam for a vehicle seat including the polyurethane foam may have a plurality of hardnesses according to temperature. In more detail, the foam for a vehicle seat may have two or more glass transition temperatures and have three or more levels of hardness according to temperature, which will be described later in detail.

Foam for Vehicle Seats

The foam for a vehicle seat according to the present disclosure may include polyurethane foam prepared from the polyurethane foam-forming composition.

In example embodiments, the foam for a vehicle seat may include a carbon nanotube (CNT) coating layer coated onto at least one surface of the polyurethane foam.

Polyurethane Foam

The polyurethane foam of the present disclosure may have two or more glass transition temperatures.

In an embodiment, the glass transition temperature of the polyurethane foam may be about 30 to about 60° C. If the glass transition temperature of the polyurethane foam is less than about 30° C., and when electricity (voltage) is applied to the polyurethane foam, the temperature of the polyurethane foam rises. Since the glass transition temperature is slightly higher than room temperature (25° C.), it may not be easy to apply a temperature change to the polyurethane foam. If the polyurethane foam has a glass transition temperature of more than 60° C., the polyurethane foam may be thermally decomposed before hardness changes due to the high glass transition temperature. The description of applying electricity (voltage) to the polyurethane foam will be described later in detail.

In an embodiment, the two or more glass transition temperatures may have a difference in glass transition temperature of about 10 to about 30° C. from each other. If two or more glass transition temperatures have a glass transition temperature difference of less than about 10° C. from each other, the temperature difference between the glass transition temperatures is small and it may not be easy to control the hardness of the polyurethane foam. If two or more glass transition temperatures have a glass transition temperature difference of more than about 30° C. from each other, the polyurethane foam has a high glass transition temperature and may be thermally decomposed before hardness changes.

In an embodiment, the polyurethane foam may have two glass transition temperatures, for example, a first glass transition temperature and a second glass transition temperature. Accordingly, the polyurethane foam may have three levels of hardness according to temperature. Specifically, the polyurethane foam has a first stage hardness at a temperature less than the first glass transition temperature, a second stage hardness at a temperature equal to or higher than the first glass transition temperature and less than the second glass transition temperature, and may have a third level of hardness at a temperature higher than the second glass transition temperature. For example, the hardness of the polyurethane foam may decrease when the temperature rises and reaches the first glass transition temperature and the second glass transition temperature, respectively. The polyurethane foam may have a first stage hardness of about 10 to about 20 kPa, a second stage hardness of about 6 to about 10 kPa, and a third stage hardness of about 3 to about 6 kPa.

For convenience of description, the polyurethane foam has been described as having two glass transition temperatures and three levels of hardness according to temperature, but the present disclosure is not particularly limited thereto, and the polyurethane foam may have three or more glass transition temperatures. In the case of having a transition temperature, a hardness of 4 or more levels may be provided depending on the temperature.

Carbon Nanotube (CNT) Coating Layer

Since carbon nanotubes have electrical properties such as resistance and electrical conductivity, the coating layer has electrical properties, and thus, a foam for a vehicle seat to which carbon nanotubes are applied may have electrical responsive properties.

In detail, when electricity (voltage) is applied to the foam for a vehicle seat, the temperature of the coating layer increases due to the electrical properties of the carbon nanotubes included in the coating layer, and thus the temperature of the polyurethane foam may also rise. Accordingly, the hardness of the polyurethane foam may decrease whenever the temperature of the polyurethane foam rises to reach each of the glass transition temperatures, and the hardness may reversibly increase when the temperature is lowered. For example, the foam for a vehicle seat may have a hardness of 3 or more levels according to temperature change due to electric application.

On the other hand, the carbon nanotube coating layer containing carbon nanotubes may be prepared f rom a coating layer composition.

The coating layer composition may include carbon nanotubes and a solvent.

In example embodiments, the carbon nanotubes may include, for example, one or more selected from the group consisting of SWCNTs, DWCNTs, and MWCNTs.

In an embodiment, the carbon nanotubes may be included in about 0.1 to about 5 wt % based on the total weight of the coating layer composition. If the carbon nanotubes are included in less than about 0.1 wt % based on the total weight of the coating layer composition, since the coating layer does not have sufficient electrical properties, the foam for a vehicle seat does not smoothly change temperature due to application of electricity, and accordingly, hardness control of the foam for a vehicle seat may not be smoothly performed. If the carbon nanotubes are included in more than about 5 wt % based on the total weight of the coating layer composition, the carbon nanotubes are not sufficiently dispersed in the carbon nanotube coating layer, and the carbon nanotube coating layer may not have sufficient electrical properties.

In example embodiments, the solvent may include, for example, one or more selected from the group consisting of ethanol, ultrapure water, and dimethylformamide (DMF).

In an embodiment, the solvent may be included in the remaining amount so that the coating layer composition is 100 wt % with respect to the total weight of the coating layer composition.

Meanwhile, the coating layer composition may further include a dispersant. The dispersant may improve the dispersibility of the carbon nanotubes in the coating layer composition to improve electrical conductivity of the coating layer.

In example embodiments, the dispersant may include at least one selected from the group consisting of, for example, sodium dodecylsulfate (SDS), sodium dodecylbenzenesulfonate (SDBS) and cetrimonium bromide (CTAB).

In an embodiment, the dispersant may be included in about 0.5 to about 1.5 wt % based on the total weight of the coating layer composition. If the dispersant is included in an amount of less than about 0.5 wt % based on the total weight of the coating layer composition, the dispersibility of the carbon nanotubes in the coating layer composition may decrease, thereby reducing electrical conductivity of the coating layer. If the dispersant is included in an amount greater than about 1.5 wt % based on the total weight of the coating layer composition, the coating layer composition is supersaturated, and thus electrical conductivity may be lowered.

Meanwhile, the foam for a vehicle seat may be electrically connected to an electricity application device to receive electricity. The electricity application device is not particularly limited as long as it is a device capable of applying electricity to the foam for a vehicle seat.

In example embodiments, the electric applying device may be manipulated by a user, and accordingly, the user may manipulate the electric applying device to control the hardness of the foam for a vehicle seat. In an embodiment, the electric applying device may include an operating member such as a button, a controller, or a wheel through which a user may control the hardness of a foam for a vehicle seat. In detail, the user may control the hardness level of the foam for a vehicle seat by manipulating the operating member. For example, when the foam for a vehicle seat has three levels of hardness, the manipulation member may be provided so that the user may select hardness levels of the first to third levels. When the user selects a hardness level of the foam for a vehicle seat with the operation member, electricity is applied to the foam for a vehicle seat to increase its temperature, and thus, the foam for a vehicle seat may be controlled to the hardness of the hardness level selected by the user.

As described above, since the foam for a vehicle seat includes the polyurethane foam having two or more glass transition temperatures, the foam for a vehicle seat may have three or more levels of hardness according to temperature. Accordingly, the user may control the hardness of the foam for a vehicle seat by adjusting the temperature of the foam for a vehicle seat. Therefore, the foam for a vehicle seat may provide a desired seating comfort through temperature control of the foam for a vehicle seat.

In addition, the carbon nanotube coating layer may be coated to at least one surface of the polyurethane foam. Accordingly, since the foam for a vehicle seat has electrical response characteristics, it may have a hardness of at least three levels according to a temperature change due to application of electricity. Accordingly, the user may control the hardness of the foam for a vehicle seat by applying electricity to the foam for a vehicle seat. Accordingly, the foam for a vehicle seat may provide a desired seating comfort through application of electricity to the foam for a vehicle seat.

Manufacturing Method of Foam for Vehicle Seat

Hereinafter, a method of manufacturing a foam for a vehicle seat according to the present disclosure will be described with reference to FIG. 1. In addition, the description of the composition for forming the polyurethane foam and the method of manufacturing the foam for a vehicle seat overlapping with the description of the foam for a vehicle seat will be omitted. FIG. 1 is a view illustrating a manufacturing method of a foam for a vehicle seat according to example embodiments.

Referring to FIG. 1, the method of manufacturing a foam for a vehicle seat may include manufacturing a polyurethane foam from the composition for forming polyurethane foam and coating the coating layer composition to at least one surface of the polyurethane foam. At this time, the application method is not particularly limited, and for example, roll coating, dip coating, spin coating method, casting method, die coating method, blade coating method, gravure coating method, spray coating method, doctor coating method, impregnation method, etc. may be performed, and the impregnation method may include, for example, an immersion method, a spray method, a coating method, etc., but is not limited thereto.

In example embodiments, in the step of preparing the polyurethane foam from the polyurethane foam-forming composition, the polyols, the crosslinking agent, the foaming agent, the cell opener, the surfactant, and the catalyst are stirred and mixed. After that, the polyurethane foam may be prepared by adding an isocyanate compound and stirring.

The coating layer composition may be prepared by mixing the carbon nanotubes, the dispersant and the solvent.

In example embodiments, the manufacturing method of the foam for a vehicle seat may further include, prior to coating the coating layer composition to at least one surface of the polyurethane foam, ultrasonically treating the coating layer composition.

In the step of ultrasonicating the coating layer composition, the dispersant may smoothly disperse the carbon nanotubes in the coating layer composition. For example, the step of ultrasonically treating the coating layer composition may improve the electrical conductivity of the coating layer prepared from the coating layer composition.

In an embodiment, the ultrasonic treatment may be performed at an energy of about 20 to about 50 kJ. If the ultrasonic treatment is performed at an energy of less than about 20 kJ, carbon nanotubes may not be sufficiently dispersed in the coating layer composition. If the ultrasonic treatment is performed at an energy of more than about 50 kJ, the bond of the carbon nanotubes in the coating layer composition is decomposed, and the electrical conductivity of the carbon nanotube coating layer may be lowered.

In an embodiment, the ultrasonic treatment may be performed using a tip sonicator or an ultrasonic bath.

In an embodiment, the ultrasonic treatment may be performed for about 10 to about 120 minutes.

In example embodiments, coating the coating layer composition onto at least one surface of the polyurethane foam may include impregnating the polyurethane foam into the coating layer composition, washing the polyurethane foam to obtain the foam for a vehicle seat. Manufacturing, and drying the foam for a vehicle seat may be further included.

In an embodiment, the step of impregnating the polyurethane foam into the coating layer composition may be repeated about 10 to about 200 times.

In an embodiment, the step of washing the polyurethane foam may be performed using ultrapure water.

Vehicle Beat

The foam for a vehicle seat may be included in the vehicle seat.

The foam for a vehicle seat may be mainly applied to a portion of the vehicle seat that is in contact with a user. Accordingly, since the vehicle seat including the foam for a vehicle seat may adjust the hardness of the foam for a vehicle seat, it is possible to provide a user's desired seating comfort through this.

EXAMPLE

Hereinafter, the present disclosure will be more specifically described by way of specific examples. However, the following examples represent an embodiment, and the present disclosure is not limited thereby.

Examples 1 to 5 and Comparative Examples 1 and 2

Polyols, a foaming agent, a crosslinking agent, a cell opener, a surfactant, and a catalyst were mixed with a solvent and stirred at a speed of 250 rpm for 2 minutes in a nitrogen (N2) environment at 70° C. to prepare a composition for forming polyurethane foam. Thereafter, an isocyanate compound was added to the composition for forming polyurethane foam and stirred at a speed of 8,000 rpm for 10 seconds in a nitrogen environment at room temperature (25° C.) to prepare polyurethane foam.

The polyurethane foam was cut to a length of 50 mm, a width of 50 mm, and a height of 25 mm to prepare polyurethane foam specimens of Examples 1 to 5 and Comparative Examples 1 and 2. At this time, polytetramethylene glycol (PTMG) and polycaprolactone (PCL) as the polyols, methylene diphenyl diisocyanate (MDI) as isocyanate compound, glycerin as crosslinking agent, ultrapure water as foaming agent, cell opener Lupranol 2048/2 as the catalyst, B-8734 and Niax L 5309 as the surfactants, TEDA-33P and Niax BL 17 as the catalysts, and ultrapure water as the solvent were used. The contents of polyols, isocyanate compound, crosslinking agent, foaming agent, cell opener, surfactant and catalyst relative to the total weight of the composition for forming polyurethane foam are illustrated in Table 1 below.

Then, a coating layer composition including carbon nanotubes, a dispersant, and a solvent was prepared. At this time, multi-walled carbon nanotubes (MWCNT) were used as carbon nanotubes, sodium dodecylsulfate (SDS) as a dispersant, and ultrapure water as a solvent. Table 2 below illustrates the contents of carbon nanotubes and the dispersant relative to the total contents of the coating layer composition. At this time, the content of the solvent is not illustrated in Table 2, but it is included in the remaining amount so that the total sum is 100 wt %.

TABLE 1

| Division | Ingredient | Example 1 (wt %) | Example 2 (wt %) | Example 3 (wt %) | Example 4 (wt %) | Example 5 (wt %) | Comparative Example 1 (wt %) | Comparative Example 2 (wt %) |
|---|---|---|---|---|---|---|---|---|
| Polyol 1 | PCL | 37.36 | 37.36 | 37.36 | 37.36 | 37.36 | 18.68 | 12.45 |
| Polyol 2 | PTMG | 37.36 | 37.36 | 37.36 | 37.36 | 37.36 | 56.04 | 62.27 |
| Isocyanate Compound | MDI | 21.31 | 21.31 | 21.31 | 21.31 | 21.31 | 21.31 | 21.31 |
| Cross-linking Agent | Glycerin | 0.3 | 0.3 | 0.3 | 0.3 | 0.3 | 0.3 | 0.3 |
| Blowing Agent | D.I water | 1.05 | 1.05 | 1.05 | 1.05 | 1.05 | 1.05 | 1.05 |
| Cell Opener | Lupranol 2048/2 | 1.5 | 1.5 | 1.5 | 1.5 | 1.5 | 1.5 | 1.5 |
| Surfactant 1 | B-8734 | 0.23 | 0.23 | 0.23 | 0.23 | 0.23 | 0.23 | 0.23 |
| Surfactant 2 | Niax L5309 | 0.52 | 0.52 | 0.52 | 0.52 | 0.52 | 0.52 | 0.52 |
| Catalyst 1 | TEDA-33P | 0.3 | 0.3 | 0.3 | 0.3 | 0.3 | 0.3 | 0.3 |
| Catalyst 2 | Niax BL17 | 0.07 | 0.07 | 0.07 | 0.07 | 0.07 | 0.07 | 0.07 |

TABLE 2

| Division | Ingredient | Example 2-1 (wt %) | Example 3-1 (wt %) | Example 4 -1 (wt %) | Example 5-1 (wt %) |
|---|---|---|---|---|---|
| Carbon Nanotube | MWCNT | 0.21 | 3.6 | 3.02 | 2.07 |
| Dispersant | SDS | 1 | 1 | 1 | 1 |

Thereafter, the coating layer composition was ultrasonically treated with 40 kJ energy for 30 minutes using HD 4200 of SONOPULS, and then the polyurethane foam specimens of Examples 2 to 5 were respectively prepared according to Examples 2-1 to 5-1 in Table 2 above. Each coating layer composition was repeatedly impregnated 100 times. Then, the polyurethane foam specimen was washed in ultrapure water and dried at 60° C. for 240 minutes to prepare a coating layer on the surface of the polyurethane foam specimen.

For example, the coating layer was not coated to the surfaces of the polyurethane foam specimens of Example 1 and Comparative Examples 1 and 2, and the coating layers of Examples 2-1 to 5-1 were respectively coated onto the surfaces of the polyurethane foam specimens of Examples 2 to 5. This coating and the resulting carbon nanotube coating layer-coated foam specimens for a vehicle seat will be referred to as Preparation Examples 2 to 5, respectively. In addition, hereinafter, the polyurethane foam specimens of Example 1 and Comparative Examples 1 and 2 will be referred to as foam for a vehicle seat specimens of Preparation Example 1 and Comparative Preparation Examples 1 and 2.

Hardness Evaluation

Figure 2:
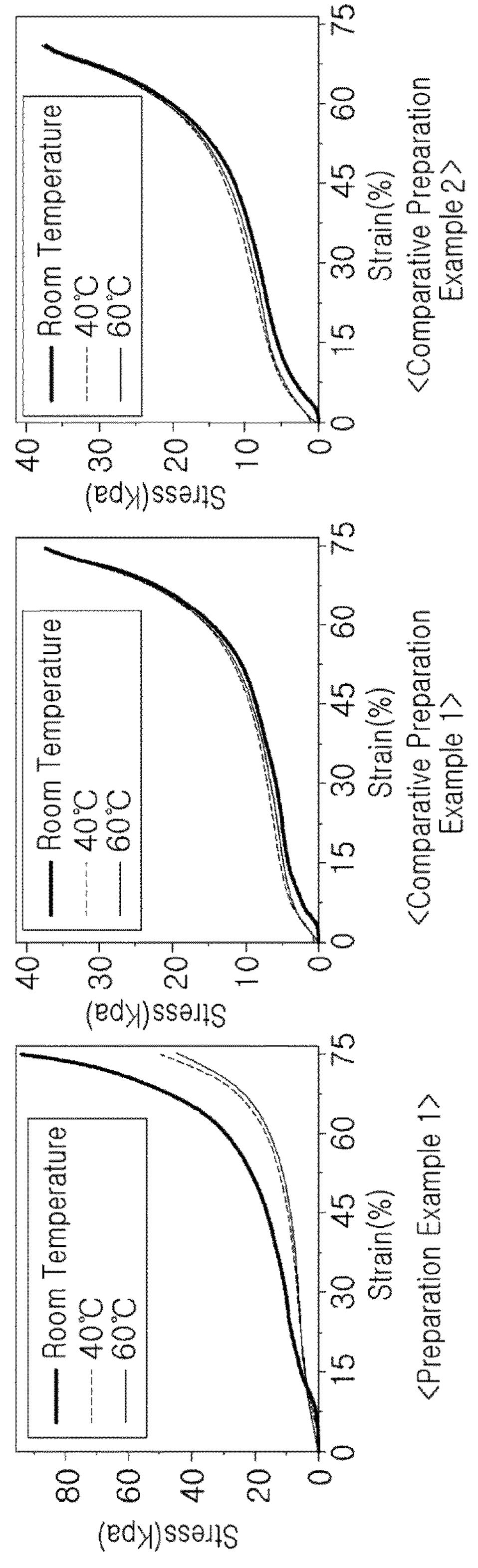
FIG. 2 is a graph illustrating stress-strain curves of foam specimens for vehicle seats according to Comparative Preparation Examples and Preparation Examples of the present disclosure.

After cutting the foam specimens for vehicle seats of Preparation Examples 1 to 5 and Comparative Preparation Examples 1 and 2 into a length of 50 mm, a width of 50 mm, and a height of 25 mm, using INSTRON E-3000, 40° Stress-strain diagram (stress-strain curve, SS curve) were derived at room temperature (25° C.), 40° C. and 60° C., respectively. In detail, a foam specimen for a vehicle seat is placed on a disc plate with a smooth surface of E-3000 and a diameter of 200 mm, and a flat plate with a cross-sectional area of 500 mm$^2$ with 100 holes with a diameter of 6 mm spaced 20 mm apart is used to fix the foam specimen for vehicle seat, and then compress the foam specimen for vehicle seat to 75% of the initial thickness of the foam specimen for vehicle seat at a test speed of 100 mm/min 3 times and then compress 4 times. The 40% compressive strength, the sag factor, and the hysteresis loss rate of the foam specimens for vehicle seats were measured. The 40% compressive strength is calculated by dividing the force applied when the foam for a vehicle seat specimen is compressed by 40% by the cross-sectional area (50 mm*50 mm) of the foam for a vehicle seat specimen. The sag factor is applied when the foam for a vehicle seat specimen is compressed by 65%, and is calculated by dividing the losing force by the force applied when the foam for a vehicle seat specimen is compressed by 25%. The hysteresis loss rate was calculated by dividing the cross-sectional area of the pressurized part of Stress-strain diagrams of foam specimens for vehicle seats of Preparation Example 1 and Comparative Preparation Examples 1 and 2 are illustrated in FIG. 2.

Electrical Response Characteristic Evaluation

After cutting the foam specimens for vehicle seats of Preparation Examples 1 to 5 and Comparative Preparation Examples 1 and 2 into a length of 20 mm, a width of 20 mm, and a height of 10 mm, grounded to a KEYSIGHT Digital multimeter, the volume resistance value of the foam specimens for vehicle seats (p) was measured. Then, the electrical conductivity of the foam specimen for a vehicle seat was derived using the volume resistance value as illustrated in Equation 1 below.

$$\sigma = L/(\rho * W * H) \quad \text{[Equation 1]}$$

In this case, a is the volume electrical conductivity of the foam specimen for vehicle seats, p is the volume resistance value of the foam specimen for vehicle seats, W is the width of the foam specimen for vehicle seats, L is the length of the foam specimen for vehicle seats, H is the height of the foam specimen for vehicle seats.

Then, a voltage of 30V is applied to the foam specimen for vehicle seat, and the time for the surface temperature of the foam specimen for vehicle seat to reach 40° C. (t1) and the time (t2) to reach 60° C. with a contact temperature sensor was measured to evaluate the electrical response characteristics of the foam for a vehicle seat specimen.

Figure 3:
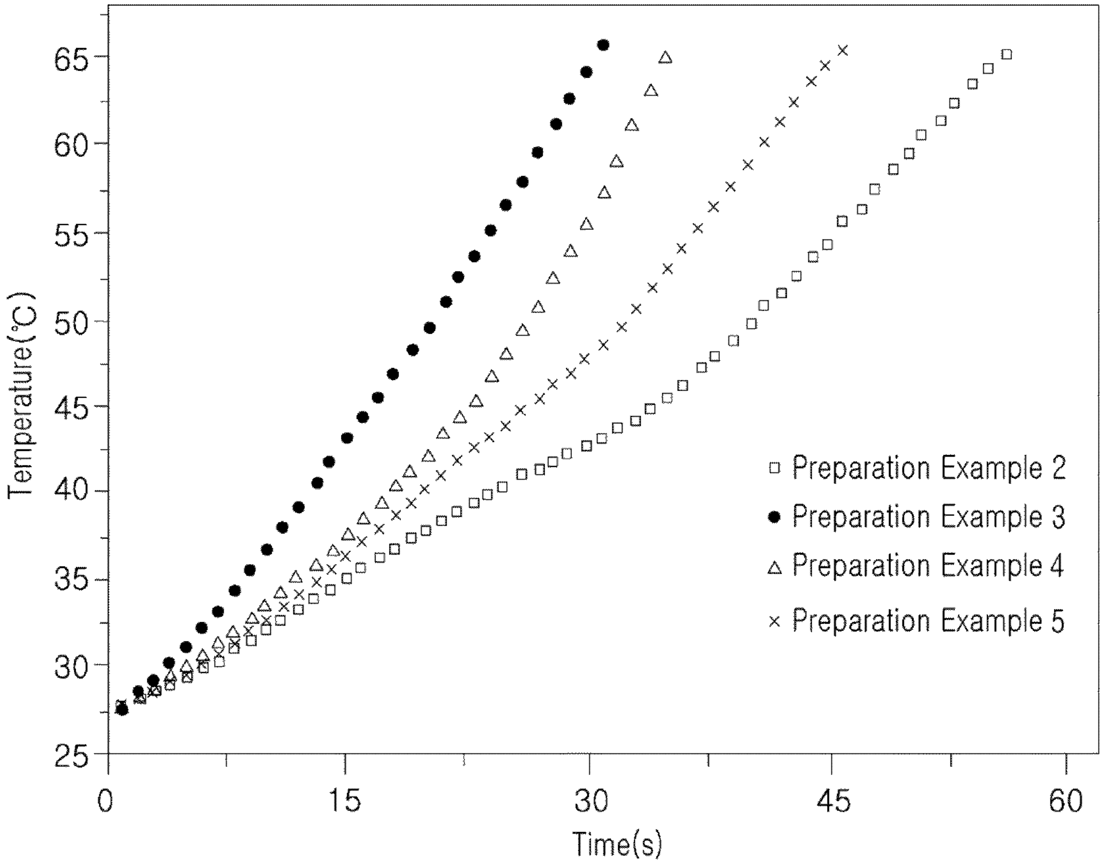
FIG. 3 is a graph illustrating temperature change over time of a foam specimen for a vehicle seat according to a manufacturing example of the present disclosure.

The electrical conductivity, t1 and t2 of the foam specimens for vehicle seats of Preparation Examples 1 to 5 and Comparative Preparation Examples 1 and 2 are illustrated in Table 3 below, and a graph illustrating the temperature change over time of the foam specimens for vehicle seats of Preparation Examples 2 to 5 is illustrated in FIG. 3.

the present disclosure, so that the foam for a vehicle seat may have electrical response characteristics.

On the other hand, the foam specimen for vehicle seat of Preparation Example 3 has the smallest t1 and t2, and the foam specimen for vehicle seat of Preparation Example 2 has the largest t1 and t2, and thus, it was confirmed that the foam for a vehicle seat specimens of Preparation Example 3, the foam for a vehicle seat specimens of Preparation Example 4, and the foam for a vehicle seat specimens of Preparation Examples 5 and 2 had small t1 and t2 in that order. Therefore, when the carbon nanotubes of the present disclosure are included in about 0.1 to about 5 wt % based on the total weight of the coating layer composition, it can be seen that the foam for a vehicle seat may have improved electrical response characteristics as the carbon nanotubes are included in the coating layer composition in a high content.

TABLE 3

| | Preparation Example 1 | Preparation Example 2 | Preparation Example 3 | Preparation Example 4 | Preparation Example 5 | Comparative Preparation Example 1 | Comparative Preparation Example 2 |
|---|---|---|---|---|---|---|---|
| σ(S/m) | — | 0.2 | 0.5 | 0.455 | 0.426 | — | — |
| t1(s) | — | 24 | 13 | 17 | 19 | — | — |
| t2(s) | — | 50 | 28 | 32 | 42 | — | — |

As can be seen from FIG. 2, the foam specimens for vehicle seats of Preparation Example 1 have different stress-strain curves at room temperature, 40° C., and 60° C., but the foam specimens for vehicle seats of Comparative Preparation Examples 1 and 2 was confirmed to have similar stress-strain curves at room temperature, 40° C. and 60° C. In detail, for example, the foam specimen for a vehicle seat of Preparation Example 1 had a strain of 51% at room temperature, a strain of 63% at 40° C., and a strain of 64% at 60° C. at a stress of 20 kPa, and it was confirmed that they had different hardnesses at each temperature. On the other hand, the foam specimen for vehicle seat of Comparative Preparation Example 1 has a strain rate of 64% at room temperature, 40° C. and 60° C., and the foam specimen for vehicle seat of Comparative Preparation Example 2 has a deformation rate of 64% at room temperature, 40° C. and 60° C., and it was confirmed that each of Comparative Preparation Examples 1 and 2 had the same hardness at each temperature. From this, the polyurethane foam-forming composition of the present disclosure includes the two or more types of polyols having different melting points, and the two or more types of polyols are included in the polyurethane foam-forming composition in the same weight ratio, respectively, so that the polyurethane foam is formed. It can be seen that the foam has two or more glass transition temperatures, and accordingly, the foam for a vehicle seat of the present disclosure may have three levels of hardness according to temperature.

In addition, as can be seen from FIG. 3 and Table 3, it was confirmed that the foam specimens for vehicle seats of Preparation Examples 2 to 5 had electrical conductivity of 0.2 S/m or more and thus had electrical response characteristics. On the other hand, it was confirmed that the foam specimens for vehicle seats of Preparation Example 1 and Comparative Preparation Examples 1 and 2 did not have electrical conductivity. From this, it can be seen that the carbon nanotube coating layer having electrical characteristics is coated on the surface of the polyurethane foam of Although the embodiments have been described in detail above, these are merely exemplary, and those skilled in the art will understand that various modifications and equivalent other embodiments are possible therefrom. Therefore, the true technical scope of protection of the present disclosure should be determined by the technical spirit of the appended claims.

Specific executions described in the embodiments are examples, and do not limit the scope of the embodiments in any way. In addition, if there is no specific reference such as "essential" or "important," it may not be a necessary component for the application of the present disclosure.

As set forth above, since the foam for a vehicle seat according to example embodiments includes the two or more types of polyols having different melting points and the two or more types of polyols are included in the composition for forming polyurethane foam in the same weight ratio, the foam for a vehicle seat may have a plurality of hardnesses according to temperature. Accordingly, the user may control the hardness of the foam for a vehicle seat by adjusting the temperature of the foam for a vehicle seat. Accordingly, the foam for a vehicle seat may provide a required seating comfort through temperature control of the foam for a vehicle seat.

In addition, a carbon nanotube coating layer may be coated to at least one surface of the polyurethane foam. Accordingly, the foam for a vehicle seat has electrical response characteristics, and may thus have a plurality of hardnesses according to a temperature change due to the application of electricity. Accordingly, the user may control the hardness of the vehicle seat foam by applying electricity to the foam for a vehicle seat. Accordingly, the foam for a vehicle seat may provide a required seating comfort through application of electricity to the foam for a vehicle seat.

In the specification of the embodiments (particularly in the claims), the use of the term "above" and similar indicating terms may correspond to both singular and plural. In addition, when a range is described in the examples, it includes the disclosure to which individual values belonging to the range are applied (unless there is a description to the contrary), and it is as if each individual value constituting the above range was described in the detailed description. Finally, if there is no explicit description or description of the order of steps constituting the method according to the embodiment, the steps may be performed in an appropriate order. Examples are not necessarily limited according to the order of description of the steps. The use of all examples or illustrative terms (e.g., etc.) in the embodiments are merely intended to describe the embodiments in detail. Unless limited by the claims, the scope of the embodiments is not limited due to the above examples or illustrative terms. In addition, those skilled in the art may appreciate that various modifications, combinations and changes may be made according to design conditions and factors within the scope of the appended claims or equivalents thereof.

While example embodiments have been illustrated and described above, it will be apparent to those skilled in the art that modifications and variations could be made without departing from the scope of the present disclosure as defined by the appended claims.

What is claimed is:

1. A composition for forming polyurethane foam, comprising:

a polyol mixture including two or more polyols having different melting points, an isocyanate compound, and a blowing agent, wherein the two or more polyols are respectively included in the same weight ratio, wherein each of the two or more polyols is included in 30 to 40 wt % based on a total weight of the composition for forming the polyurethane foam.

2. The composition of claim 1, further comprising a crosslinking agent, a cell opener, a surfactant, and a catalyst.

3. The composition of claim 1, wherein the two or more polyols include two or more selected from the group consisting of polytetramethylene glycol (PTMG), polycaprolactone (PCL), polyethylene glycol (PEG), and polytrimethylene ether glycol (PO3G).

4. The composition of claim 1, wherein a melting point of each of the two or more polyols is 10 to 65° C., and the two or more polyols have a melting point difference of 10 to 50° C. from each other.

5. A foam for a vehicle seat, comprising:

a polyurethane foam manufactured from the composition according to claim 1.

6. The foam for a vehicle seat of claim 5, wherein the polyurethane foam includes a carbon nanotube (CNT) coating layer coated on at least one surface of the polyurethane foam.

7. The foam for a vehicle seat of claim 5, wherein the polyurethane foam has two or more glass transition temperatures (Tg).

8. The foam for a vehicle seat of claim 7, wherein a glass transition temperature of the polyurethane foam is 30 to 60° C., and the two or more glass transition temperatures have a glass transition temperature difference of 10 to 30° C. from each other.

9. A method of manufacturing a foam for a vehicle seat, comprising:

manufacturing a polyurethane foam from the composition according to claim 1; and coating a coating layer composition containing 1 to 5 wt % of carbon nanotubes on at least one surface of the polyurethane foam.

10. The method of claim 9, wherein the coating layer composition further comprises a dispersant and a solvent.

11. The method of claim 9, further comprising ultrasonically treating the coating layer composition prior to the coating of the coating layer composition.

12. A vehicle seat comprising:

the foam of claim 5.

* * * * *